(12) United States Patent
Gross

(10) Patent No.: US 9,410,642 B2
(45) Date of Patent: Aug. 9, 2016

(54) METHOD AND APPARATUS FOR PLASTIC DUCT BANK MANUFACTURE

(75) Inventor: Scott Gross, Fort Worth, TX (US)

(73) Assignee: CUMMINGS ELECTRICAL, L.P., Fort Worth, TX (US)

( * ) Notice: Subject to any disclaimer, the term of this patent is extended or adjusted under 35 U.S.C. 154(b) by 1105 days.

(21) Appl. No.: 13/486,953

(22) Filed: Jun. 1, 2012

(65) Prior Publication Data

US 2013/0318757 A1 Dec. 5, 2013

(51) Int. Cl.
*B23P 19/02* (2006.01)
*F16L 3/22* (2006.01)

(52) U.S. Cl.
CPC .............. *F16L 3/22* (2013.01); *Y10T 29/53657* (2015.01)

(58) Field of Classification Search
USPC .................... 29/235; 264/145, 148, 150, 151; 425/317, 377
See application file for complete search history.

(56) References Cited

U.S. PATENT DOCUMENTS

| | | | |
|---|---|---|---|
| 1,525,087 A | 2/1925 | Murray | |
| 2,161,570 A * | 6/1939 | Harris ...................... | B21C 29/04 62/DIG. 10 |
| 3,422,648 A * | 1/1969 | Lemelson ............. | B21C 23/085 264/171.12 |
| 3,606,395 A | 9/1971 | Salerno et al. | |
| 3,711,127 A | 1/1973 | Raffa | |
| 3,856,246 A | 12/1974 | Sinko | |
| 3,891,733 A * | 6/1975 | Maroschak ........... | F16L 37/084 264/150 |
| 3,962,766 A | 6/1976 | Pompidor et al. | |
| 4,440,712 A | 4/1984 | Imgram | |
| 4,601,447 A | 7/1986 | McFarland | |
| 5,167,138 A * | 12/1992 | Sinha .................... | B21C 23/005 72/253.1 |
| RE34,332 E | 8/1993 | Adams et al. | |
| 5,240,663 A * | 8/1993 | Stringaro ................. | B01J 19/32 264/150 |
| 5,605,419 A | 2/1997 | Reinert, Sr. | |
| 7,806,629 B2 | 10/2010 | McCoy | |
| 7,942,371 B1 | 5/2011 | McCoy | |
| 2009/0057497 A1 | 3/2009 | Bradbury | |

FOREIGN PATENT DOCUMENTS

| | | |
|---|---|---|
| CA | 2057852 | 6/1992 |
| CZ | 21092 U1 | 7/2010 |
| DE | 2427580 | 1/1975 |
| EP | 080466281 | 11/1997 |
| FR | 2798719 | 3/2001 |

\* cited by examiner

*Primary Examiner* — Joseph J Hail
*Assistant Examiner* — Shantese McDonald
(74) *Attorney, Agent, or Firm* — Schultz & Associates, P.C.

(57) ABSTRACT

A method and apparatus for manufacturing a duct bank comprising the steps of loading a frame with a series of templates, positioning the frame adjacent a pipe extruder, aligning a set of a plurality of holes with a die of the pipe extruder, extruding a pipe of a first length into the set of holes, repeating the steps of aligning and extruding for each set of holes, thereby forming the duct bank, banding the duct bank, and removing the duct bank from the frame.

10 Claims, 11 Drawing Sheets

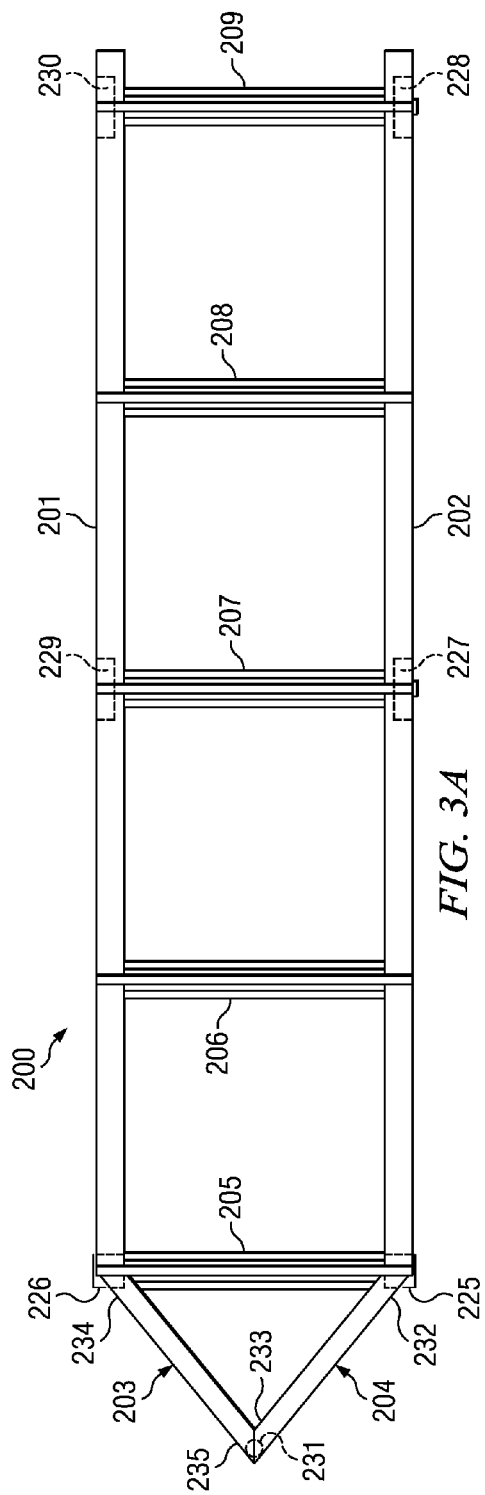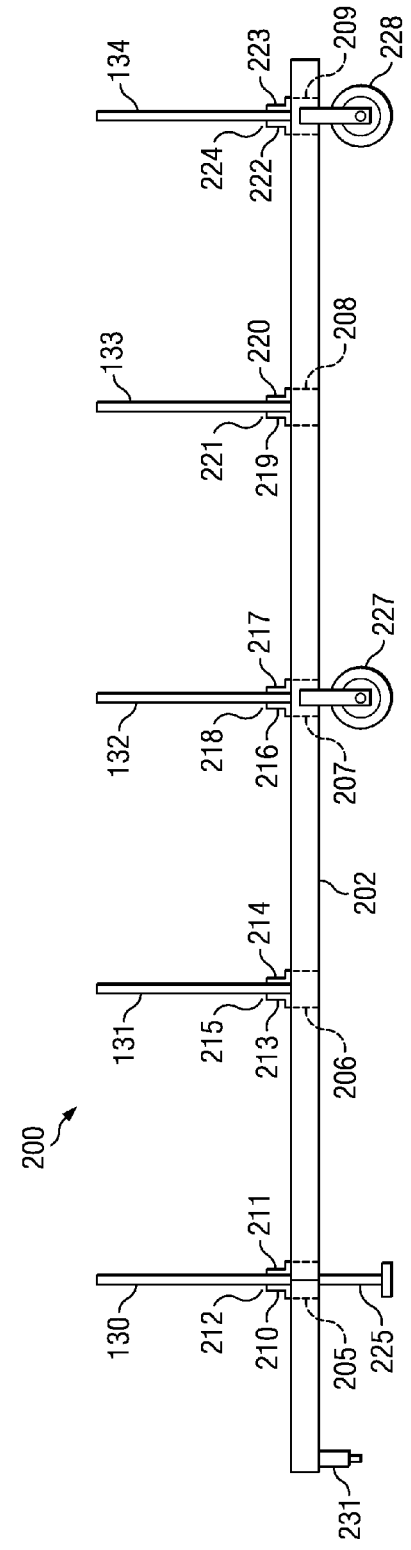

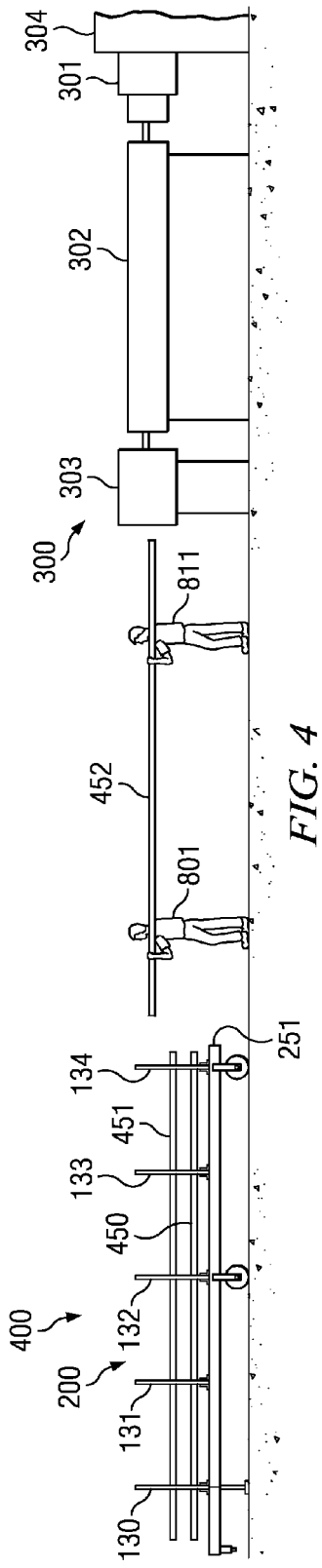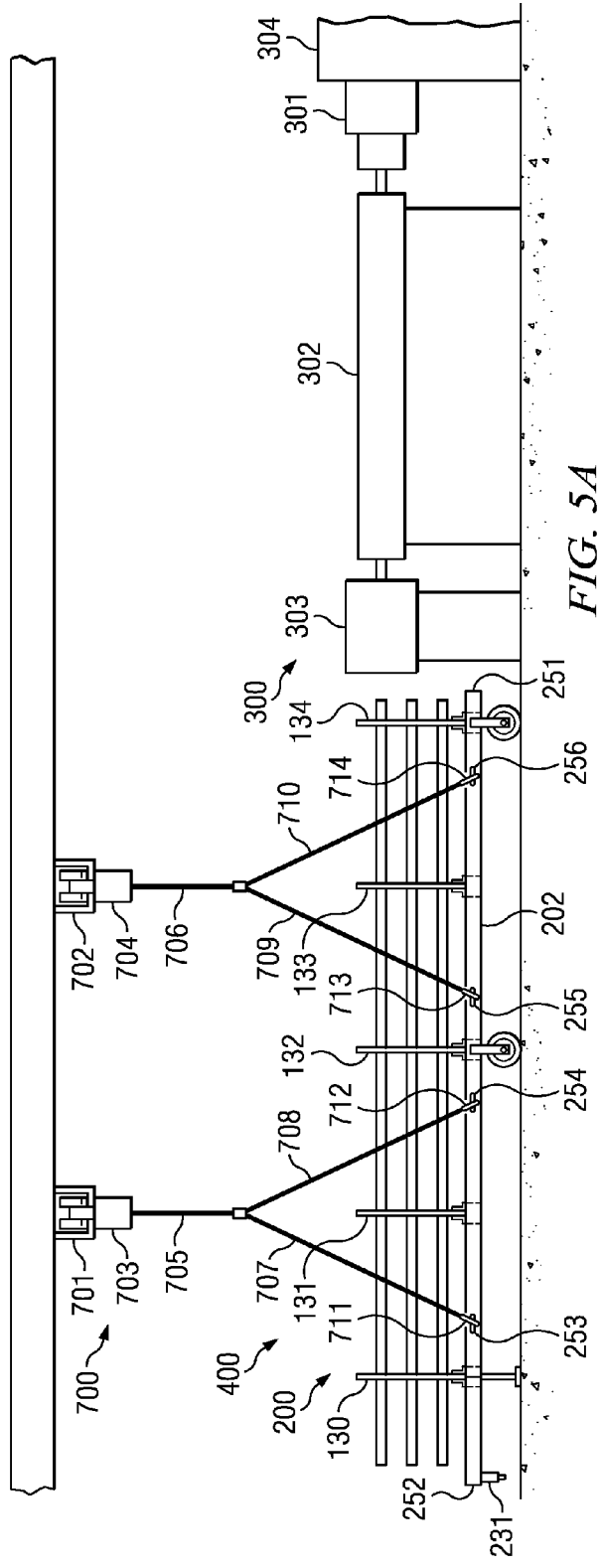

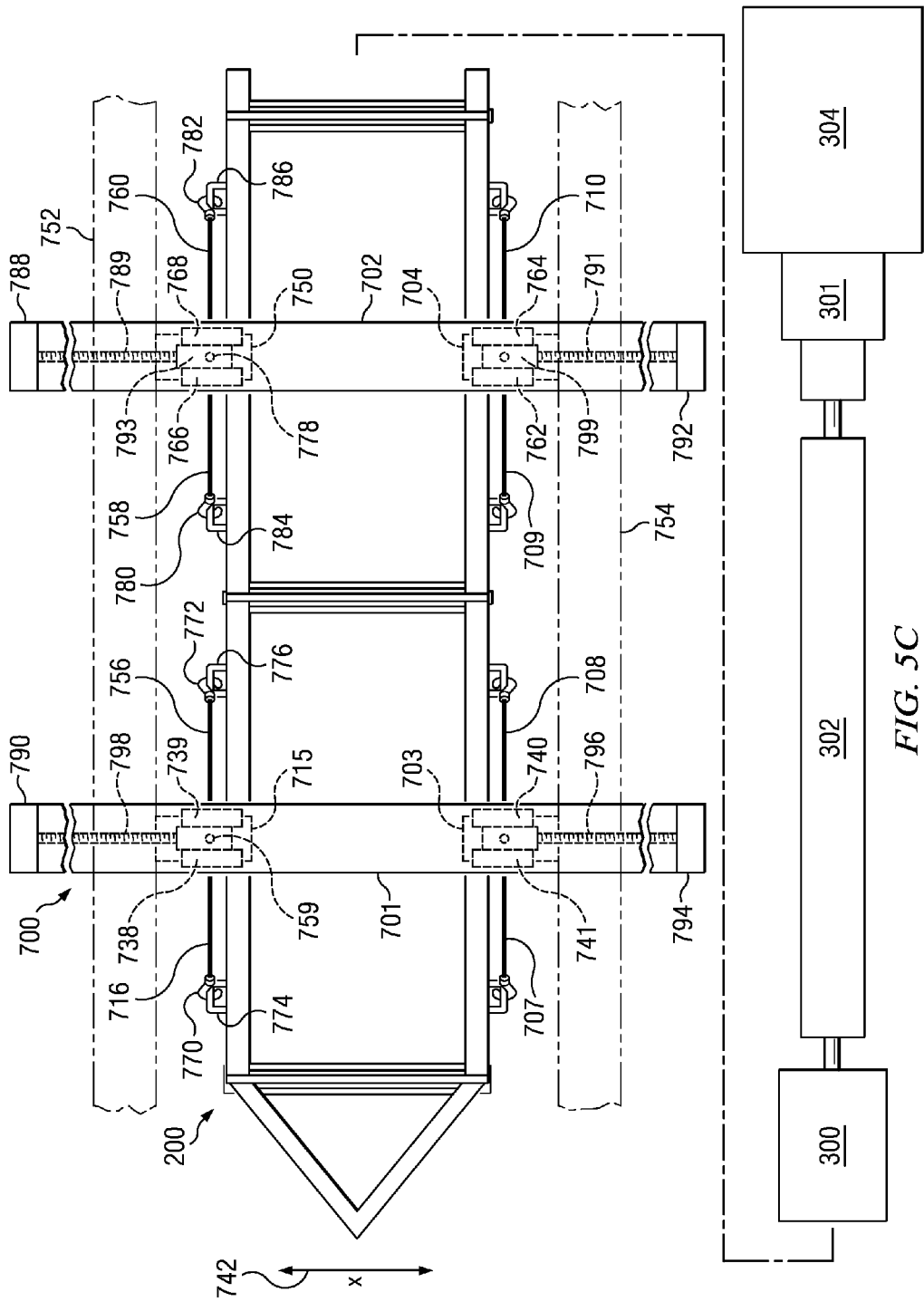

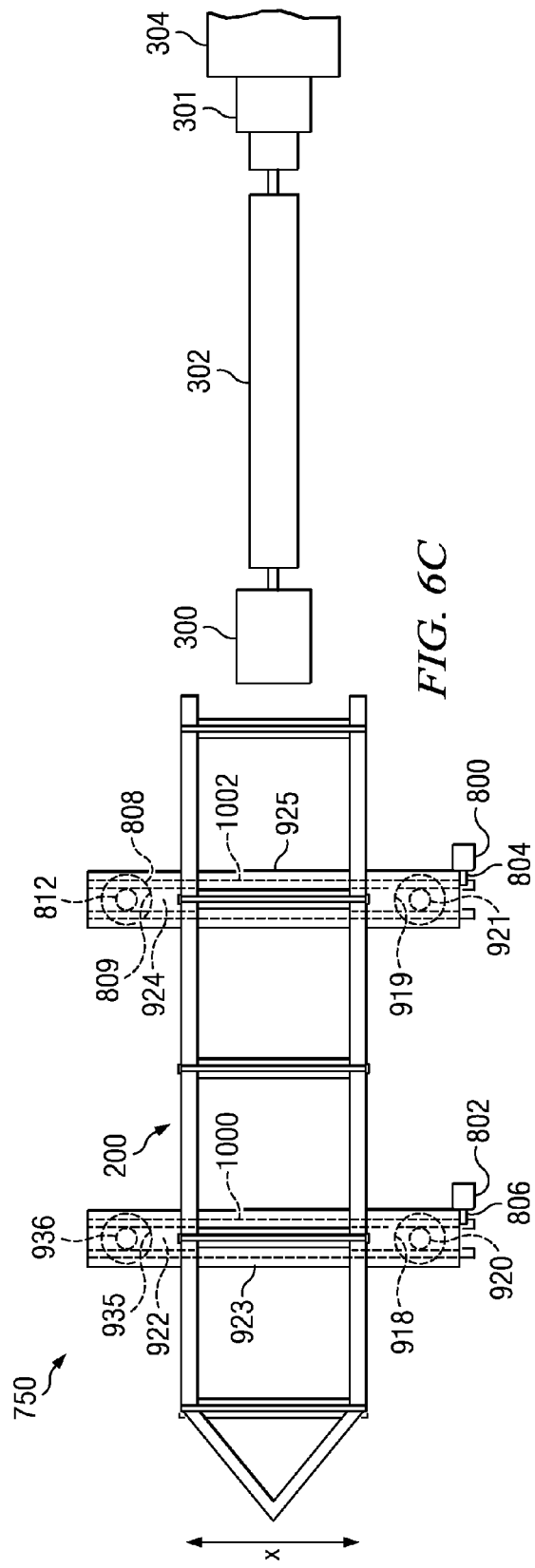

METHOD AND APPARATUS FOR PLASTIC DUCT BANK MANUFACTURE

FIELD OF THE INVENTION

The field of the invention relates to the manufacture of plastic pipe. In particular, the field of the invention relates to a method and apparatus for the prefabrication of plastic duct bank.

BACKGROUND OF THE INVENTION

The transmission of electrical power, data, and telephone communications beneath buildings is carried out through wires and cables installed inside conduit pipes. The pipes are often assembled into bundles known as "duct banks." Duct banks consist of multiple sections of ducting arranged in a rectangular pattern and held in position by "templates." The templates are generally flat rectangular spacers each having a pattern of holes through which the pipes are inserted.

Duct banks are typically assembled on site or transported to a construction site where they are installed. During installation each duct bank is loaded into a trench along a predetermined route. Each duct bank is then joined with other similar duct banks with couplings, sealed and encased in concrete.

In the prior art, duct banks are assembled on the job site either in the trench or above ground near the trench. Typically, a first set of workers holds a set of templates at a predetermined angle and at the correct spacing to position and hold the ducts in place. A second set of workers positions each pipe in a set of corresponding holes in the templates by sliding it through the holes. The process is labor-intensive, dangerous, and subject to frequent interruption during assembly in order to provide realignment of the templates and undo jamming of the pipes.

The prior art has attempted to solve some of these problems. For example, U.S. Pat. No. 3,606,395 to Salerno, et al. discloses a method and apparatus of laying underground cables using preformed conduit sections. The preformed conduit sections are rectangular blocks having four longitudinal holes forming conduit pipes. The preformed conduit sections are aligned end to end to form four continuous ducts. However, the block conduit sections in Salerno require excess material to surround each conduit in order to form the conduit section. This excess material requires additional raw materials, which increases manufacturing costs.

U.S. Pat. No. 3,711,127 to Raffa discloses a closure to arrange conduit members into a duct bank. The closure includes a horizontal base, upright side walls formed integrally with the base, longitudinal side walls, and upright members attached to the base having a generally rectangular shape adapted to align and support conduit members. The upright side walls have tapered sleeves sized to align and support the conduit members. The closure is sealed and filled with an inert gas to improve insulation and heat dissipation. However, Raffa requires the use of a housing to encase the duct bank and inert gas to fill the housing, thereby making the arrangement expensive to manufacture and assemble.

U.S. Pat. No. 5,605,419 to Reinert discloses a method for assembling and installing duct banks. The duct banks are assembled with upright plastic grids having apertures sized to axially receive conduits. The grids are spaced apart along the length of the conduits. Spacers are installed in groups of four, onto conduit members, one on each corner of the cross section of the duct bank. Wooden supports are placed across the conduits to support the duct bank. However, the method requires the duct bank to be assembled at the jobsite, which requires additional workers and exposes the workers to unnecessary dangers, thereby increasing installation costs.

The prior art fails to disclose or suggest a method and apparatus for prefabricating duct banks at the point of pipe extrusion. The prior art also fails to disclose an automated method of assembly of duct banks. Therefore, there is a need in the prior art for a method and apparatus for manufacturing and preassembling a duct bank that reduces time and labor costs and increases worker safety.

SUMMARY

In a preferred embodiment, a method for manufacturing a duct bank comprising the steps of providing a set of rigid templates, each of the templates comprising a set of patterned holes; providing a frame having a set of supports for the templates loading the set of supports with the set of templates; positioning the templates to align a set of holes; positioning the frame adjacent an extrusion machine, the extrusion machine having a coaxial extrusion die, a cooling section, and a cutter; aligning the set of holes with the extrusion die; extruding a pipe of a first predetermined length into the set of holes; repeating the steps of aligning and extruding until a pipe is extruded into each set of holes, thereby forming the duct bank; banding the duct bank; and removing the duct bank from the frame.

In a preferred embodiment, the step of extruding a pipe of a first predetermined length into the set of holes includes the steps of cooling the pipe and cutting the pipe at the first predetermined length.

In a preferred embodiment, the step of extruding at least one pipe of the second predetermined length includes the steps of cooling the at least one pipe and cutting the at least one pipe at the second predetermined length.

BRIEF DESCRIPTION OF THE DRAWINGS

The disclosed embodiments will described with reference to the accompanying drawings. Like pieces in different drawings carry the same number.

FIG. 3A is a top view of a frame of a preferred embodiment.

FIG. 3B is a side view of a frame of a preferred embodiment.

FIG. 4 is a side view of a preferred embodiment.

FIG. 5A is a side view of a preferred embodiment.

FIG. 5C is a plan view of a preferred embodiment.

FIG. 6C is a plan view of a preferred embodiment.

DETAILED DESCRIPTION

Figure 1:
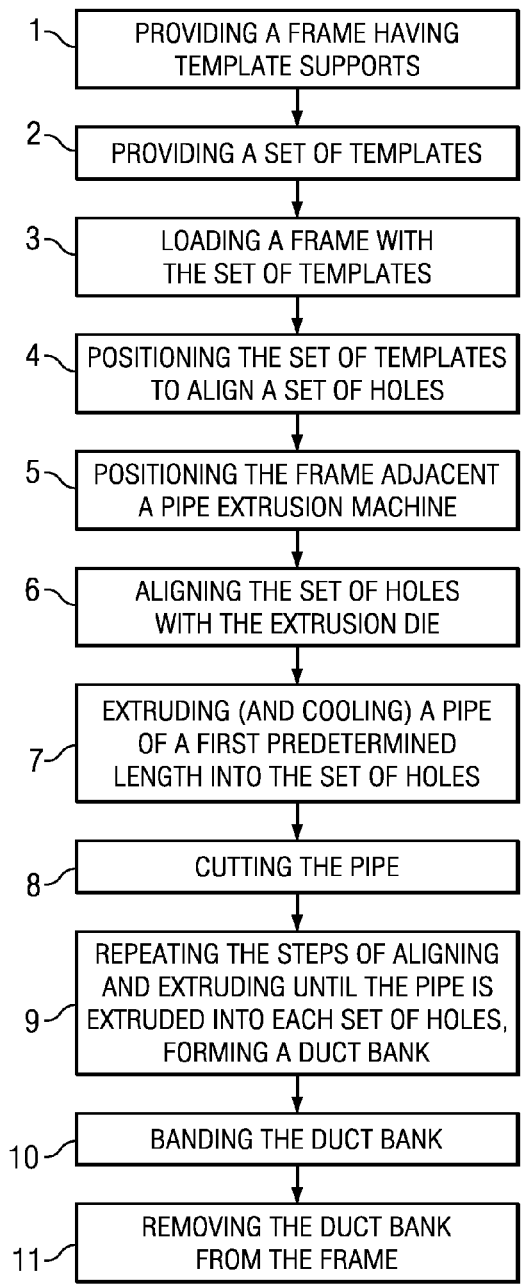
FIG. 1 is a flow chart of a preferred embodiment.

Referring to FIG. 1, a method for manufacturing a duct bank is described. In a preferred embodiment, in step 1, a movable frame is provided having a set of regularly spaced template supports. In step 2, a set of templates is provided, each including a set of holes in a pattern. In step 3, the set of templates are loaded into the template supports. In step 4, the set of templates are positioned so that each of the sets of holes is aligned to form a set of coaxially aligned holes or "receivers" for the duct pipes. In step 5, the frame and the set of adjusted templates is positioned adjacent a pipe extrusion machine, the pipe extrusion machine having an extrusion die, a cooling section, and a cutter. In an optional step 6, a chosen receiver is positioned relative to an x-y plane to be coaxial with the extrusion die. In step 7, a pipe of a first predetermined length is extruded into the receiver. Step 7 includes the optional step of cooling the pipe. In step 8, the pipe is cut to a first predetermined length. In step 9, steps 6, 7 and 8 are repeated until all receivers are full, thereby forming a duct bank. The duct bank is banded in step 10 and removed from the frame in step 11.

Figure 2A:
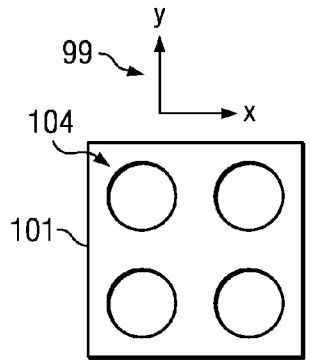
FIG. 2A is a side view of a template of a preferred embodiment.
Figure 2B:
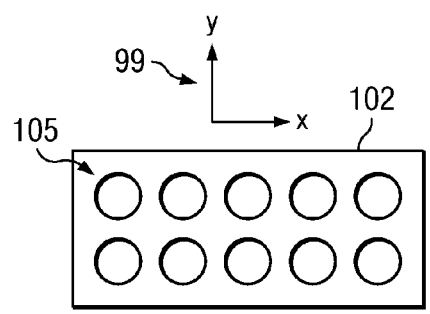
FIG. 2B is a side view of a template of a preferred embodiment.
Figure 2C:
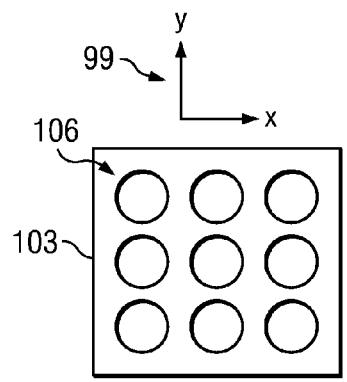
FIG. 2C is a side view of a template of a preferred embodiment.

Referring to FIGS. 2A, 2B, and 2C, examples of preferred embodiments of the templates are shown. Templates 101, 102, and 103 each have generally rectangular hole pattern 104, 105, and 106, arranged in x-y plane 99. Each hole has a larger diameter than the diameter of the pipe to be received. In a preferred embodiment, the holes have a diameter about 15-20% larger than that of the pipe. The diameter of the pipe and the number of holes, including the number of rows and columns, vary according to the desired duct bank to be assembled. Other geometrical patterns, besides rectangular, may be employed.

In a preferred embodiment, the templates are generally flat having a thickness of approximately ¾ inch. Other shapes and thicknesses may be employed. In a preferred embodiment, templates 101, 102, and 103 are made of plastic, such as HDPE, Delrin, or Teflon. Other durable materials known in the art may be employed.

Referring to FIG. 3A, frame 200 includes rails 201 and 202. Angled member 203 has first end 234 and second end 235. Angled member 204 has first end 232 and second end 233. First end 234 of angled member 203 attaches to rail 201. First end 232 of angled member 204 attaches to rail 202. Second end 233 of angled member 204 attaches to second end 235 of angled member 203. Cross members 205, 206, 207, 208, and 209 connect to rails 201 and 202. Hitch 231 attaches to angled members 203 and 204 at second ends 233 and 235. Wheels 227 and 228 attach to rail 202. Wheels 229 and 230 attach to rail 201. Post 225 attaches to rail 202 and angled member 204 adjacent first end 232 of angled member 204 and rail 202. Post 226 attaches to rail 201 and angled member 203 adjacent first end 234 of angled member 203 and rail 201.

Referring to FIG. 3B, supports 210 and 211 attach to cross member 205. Supports 210 and 211 form slot 212. Slot 212 receives, supports, and orients template 130 generally perpendicularly with respect to rails 201 and 202. Supports 213 and 214 attach to cross member 206. Supports 213 and 214 form slot 215. Slot 215 receives, supports, and orients template 131 generally perpendicularly with respect to rails 201 and 202. Supports 216 and 217 attach to cross member 207. Supports 216 and 217 form slot 218. Slot 218 receives, supports, and orients template 132 generally perpendicularly with respect to rails 201 and 202. Supports 219 and 220 attach to cross member 208. Supports 219 and 220 form slot 221. Slot 221 receives, supports, and orients template 133 generally perpendicularly with respect to rails 201 and 202. Supports 222 and 223 attach to cross member 209. Supports 222 and 223 form slot 224. Slot 224 receives, supports, and orients template 134 generally perpendicularly with respect to rails 201 and 202.

The distance between cross members 205, 206, 207, 208, and 209, and thereby the distance between loaded templates 130, 131, 132, 133, and 134, is dependent upon the strength, the length, and the diameter of the desired pipe to be used in the duct bank. In one preferred embodiment, the cross members are spaced evenly to support 40' sections of pipe. In another embodiment, the cross members are spaced evenly to support 20' sections of pipe.

In a preferred embodiment, rails 201 and 202, angled members 203 and 204, cross members 205, 206, 207, 208, and 209, and supports 225 and 226 are made of steel. Other rigid and durable materials known in the art may be employed.

In a preferred embodiment, supports 210, 211, 213, 214, 216, 217, 219, 220, 222, and 223 are made of steel angle iron. Other rigid and durable materials known in the art may be employed. In other embodiments the cross members can have different cross sections, such as box channel and/or triangular supports.

In a preferred embodiment, wheels 227, 228, 229, and 230 are castor wheels. Other wheel types known in the art may be employed.

Referring to FIG. 4, in one embodiment, proximal end 251 of frame 200 is positioned adjacent extrusion system 300. Extrusion system 300 includes extruder 304, extrusion die 301 attached to extruder 304, cooling section 302, aligned with extrusion die 301, and cutter 303, aligned with cooling section 302. Each of templates 130, 131, 132, 133, and 134 is identical, and includes a set of holes arranged in the same pattern. The sets of holes are aligned by adjusting the templates, one to another, until the holes match the sets of aligned holes for receivers for the pipes.

Pipes 450 and 451 are shown positioned in the set of holes of templates 130, 131, 132, 133, and 134. Each pipe is cut to a predetermined length. The pipes can have different predetermined lengths. In one preferred embodiment, workers 801 and 811 manually transport pipe 452 from cutter 303 and insert it into one of the set of coaxially aligned holes of the templates. Workers 801 and 811 repeatedly transport and insert each pipe into the set of holes until each of the set of coaxially aligned holes contains a pipe.

The duct bank is then banded for transport. Banding includes the steps of inserting blocks at chosen intervals between the pipes and between the templates. Steel straps, as known in the art, are then positioned around the duct bank and secured in other to prevent the templates and pipes from changing position during transport. The duct bank is then lifted from the frame and transported to the jobsite for installation.

Figure 5B:
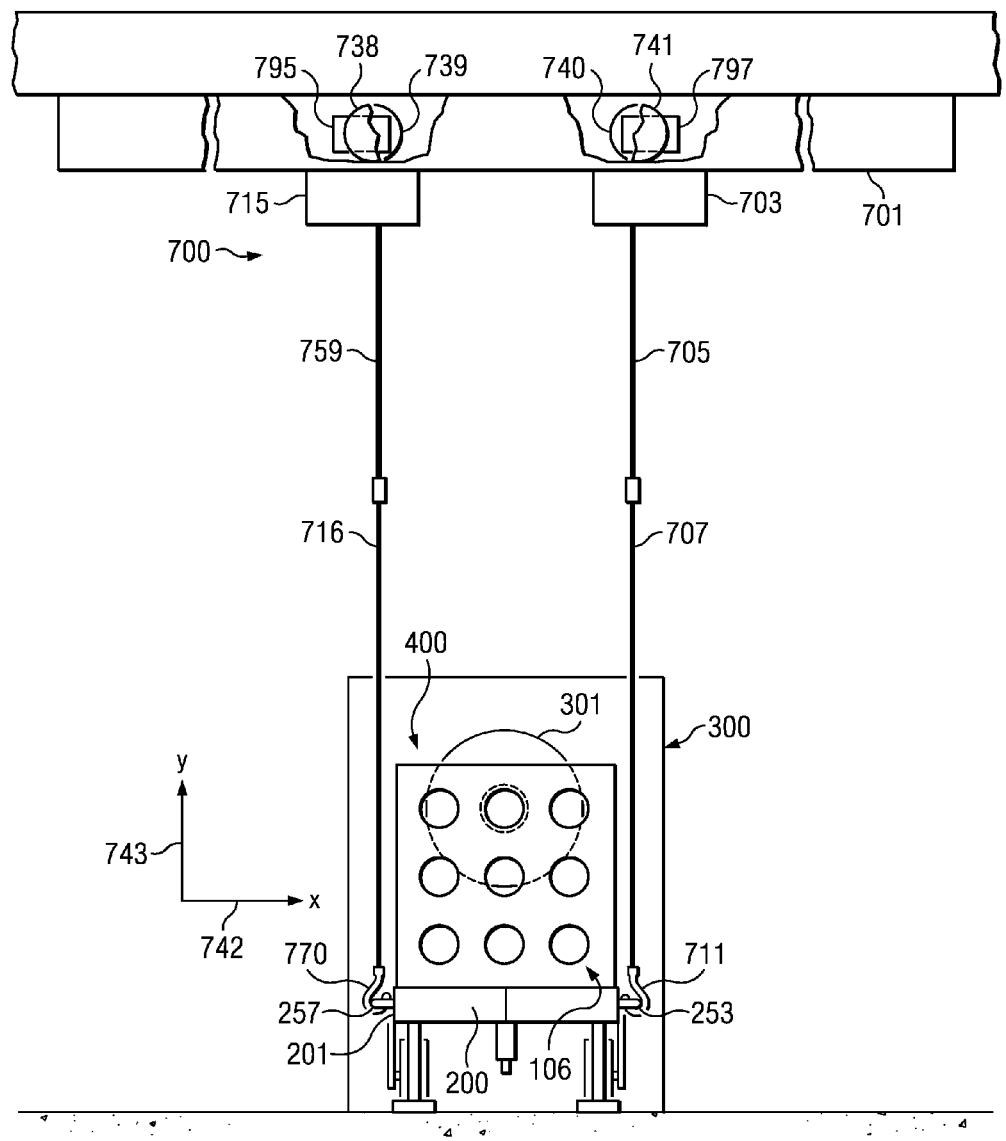
FIG. 5B is an end view of a preferred embodiment.

Referring to FIGS. 5A-5C, in another embodiment, proximal end 251 of frame 200 is positioned adjacent extrusion system 300. Extrusion system 300 includes extruder 304, extrusion die 301 attached to extruder 304, cooling section 302 collinearly aligned with extrusion die 301, and cutter 303 collinearly aligned with cooling section 302. The holes of templates 130, 131, 132, 133, and 134. The position of the frame in the x-y plane is adjusted so as to coaxially align with extrusion die 301, cooling section 302, and cutter 303 with a set of collinear holes in the templates.

In this embodiment, frame 200 is horizontally and vertically positioned with respect to extrusion system 300 by position system 700. Position system 700 includes indexing tracks 701 and 702, winches 703, 704, 715 and 750 connected to the frame by cables. The winches are typically supported overhead by attachment to beams 752 and 754. In a preferred embodiment, winches 703, 704, 715, and 750 are electric winches capable of lifting about 2,000 pounds. In one preferred embodiment, each winch is locally controlled with a drop switch (not shown). In another preferred embodiment each winch is connected to a programmable controller.

Winches 703, 704, 715 and 750 are attached to the frame by a series of cables or wire ropes. Winches 703, 704, 715 and 750 are movably attached to track 701 and 702 through a rolling suspension system including a set of carriages 797, 799, 795, and 793 operatively attached to wheels 740, 741, 762, 764, 738, 739, 766 and 768, respectively.

Winch 703 is attached to indexing track 701. Winch 703 is also attached to main cable 705. Secondary cables 707 and 708 attach to main cable 705. Hook 711 attaches to secondary cable 707. Hook 711 connects to eye hook 253. Eye hook 253 attaches to rail 202 of frame 200. Hook 712 attaches to secondary cable 708. Hook 712 connects to eye hook 254. Eye hook 254 attaches to rail 202 of frame 200.

Winch 704 is attached to indexing track 702. Winch 704 is also attached to main cable 706. Secondary cables 709 and 710 attach to main cable 706. Hook 713 attaches to secondary cable 709. Hook 713 connects to eye hook 255. Eye hook 255 attaches to rail 202 of frame 200. Hook 714 attaches to secondary cable 710. Hook 714 connects to eye hook 256. Eye hook 256 attaches to rail 202 of frame 200.

Winch 715 is attached to indexing track 701. Winch 715 is also attached to main 768. Secondary cables 716 and 756 attach to main cable 759. Hook 770 attaches to secondary cable 716. Hook 770 connects to eye hook 774 attached to the frame. Hook 772 attaches to secondary cable 756. Hook 772 connects to eye hook 776 connected to the frame.

Winch 750 is attached to indexing track 702. Winch 750 is also attached to main cable 778. Secondary cables 758 and 760 attach to main cable 778. Hook 780 attaches to secondary cable 758. Hook 780 connects to eye hook 784. Eye hook 784 is attached to the frame. Hook 782 attaches to secondary cable 760. Hook 782 connects to eye hook 786. Eye hook 786 is connected to the frame.

Winches 703, 704, 715 and 750 enable movement of frame 200 along y-axis 743, thereby enabling positioning system 700 to position each hole of geometrical 106 at a set of predetermined positions along y-axis 743.

Linear motivators 790 and 794 are positioned at the respective ends of indexing track 701. Linear motivator 790 is connected to a threaded receiver incorporated into carriage 797 by threaded rod 798. Linear motivator 794 is connected to a threaded receiver incorporated into carriage 799 by threaded rod 796. A similar set of motivators 788 and 792, threaded rods 789 and 791, and carriages are included in indexing track 702 which is connected to winches 704 and 750. Wheels 738, 739, 740, and 741 roll within indexing track 701, and wheels 762, 764, 766 and 768 roll within indexing track 702, thereby enabling movement of frame 200 along x-axis 742 and enabling position system 700 to position each hole of geometrical pattern 106 at a set of predetermined positions along x-axis 742. When activated, the linear motivators rotate the threaded rods to move the carriages and the winches along an x-axis. In a preferred embodiment, linear motivators 790 and 794 are electric motors with the appropriate transmissions to rotate the threaded rods at a desirable slow speed. In one preferred embodiment, the motivators are controlled locally by a drop switch. In another preferred embodiment, the motivators are connected to and controlled by a programmable controller which positions the frame.

Figure 6A:
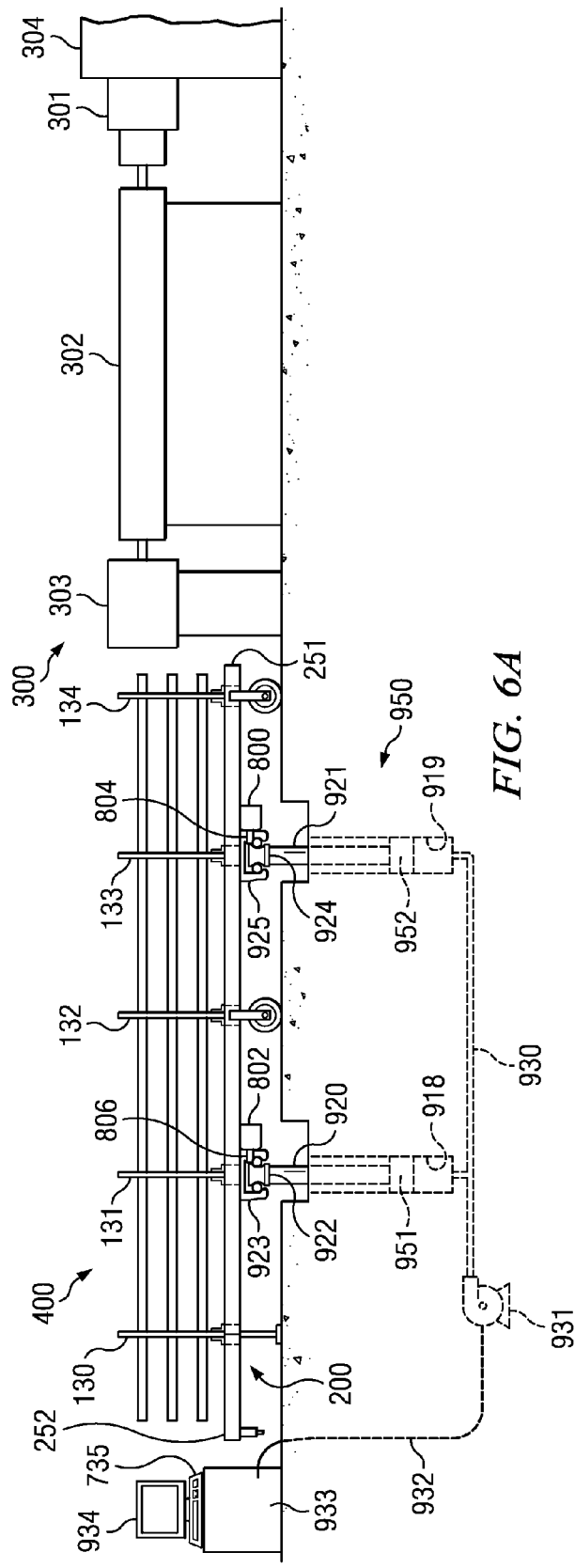
FIG. 6A is a side view of a preferred embodiment.
Figure 6B:
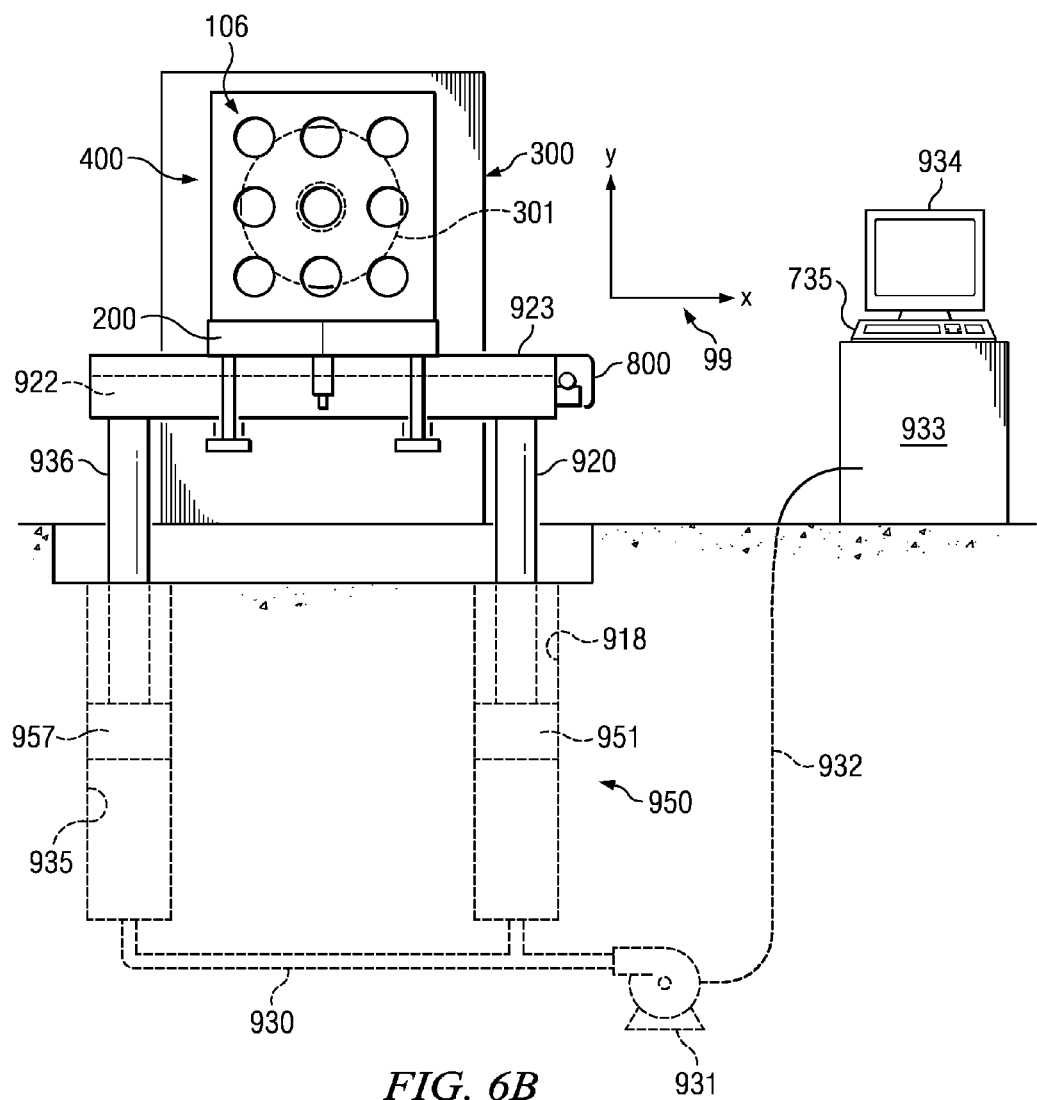
FIG. 6B is an end view of a preferred embodiment.

Referring to FIGS. 6A-6C, in another embodiment, proximal end 251 of frame 200 is positioned collinearly adjacent extrusion system 300. Extrusion system 300 includes extruder 304, extrusion die 301 attached to extruder 304, cooling section 302 collinearly aligned with extrusion die 301, and cutter 303 collinearly aligned with cooling section 302. The holes of templates 130, 131, 132, 133, and 134 coaxially align with extrusion die 301, cooling section 302, and cutter 303.

In this embodiment, frame 200 is horizontally and vertically positioned with respect to extrusion machine 300 by position system 950. Position system 950 includes indexing tracks 923 and 925 connected to a series of hydraulic lifting pistons. Indexing tracks 923 and 925 support frame 200. Indexing track 923 slidably engages with inside track 922. Inside track 922 attaches to piston rods 920 and 936. Piston rod 920 attaches to piston 951. Piston 951 slidably engages with cylinder 918. Piston rod 936 attaches to piston 957. Piston 957 slidingly engages cylinder 935.

Indexing track 925 slidably engages with inside track 924. Inside track 924 attaches to piston rods 921 and 812. Piston rod 921 attaches to piston 952. Piston 952 slidably engages with cylinder 919. Piston rod 812 attaches to piston 808. Piston 808 slidingly engages with cylinder 809. Position system 950 further includes piston rod 936 connected to inside track 922. Piston rod 936 further connects to piston 957. Piston 957 slidably engages with cylinder 935.

Each of the cylinders is connected to hydraulic fluid line 930. Hydraulic fluid line 930 connects to pump 931. In one embodiment, pump 931 is manually controlled by a foot switch. In another embodiment, pump 931 connects to controller 933 with communication line 932. Controller 933 connects to monitor 934 and keyboard 735 for data management and entry by an operator.

Linear motivator 802 is attached to outside track 923. Linear motivator 802 includes pinion 806. Pinion 806 engages rack 1000 attached to inside track 922. Linear motivator 800 is attached to indexing track 925. Linear motivator 800 includes pinion 804 which engages rack 1002 of inside track 924. In a preferred embodiment, the linear motivators include electric motors which rotate the pinions which thereby move the racks along the x-axis. In one preferred embodiment, the motivators are controlled locally using a drop switch. In another preferred embodiment, the motivators are connected to and controlled by a programmable controller which positions the frame.

The sliding engagement between inside track 922 and indexing track 923 enables movement of frame 200 along the x-axis and moves the frame to position the templates to predetermined positions along the x-axis.

Pressure from the hydraulic fluid against the pistons enables movement of frame 200 along y-axis 954 and moves the frame to position the templates to predetermined positions along the y-axis.

Figure 8A:
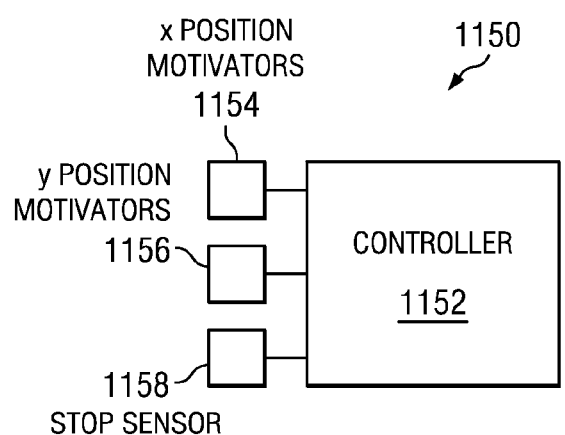
FIG. 8A is a computer architecture schematic of a controller system of a preferred embodiment.

Referring to FIG. 8A, control system 1150 is described. Controller 1152, in a preferred embodiment, includes a programmable microcontroller or a computer work station programmed with suitable programming to carry out method steps necessary to move the x motivators and the y motivators to predetermined positions in order to move the frame to a predetermined location in the x-y plane. Controller 1152 is connected to x position motivators 1154, y position motivators 1156 and stop sensor 1158.

In a preferred embodiment, stop sensor 1158 is a simple mechanical limit switch, fixed in a position of axial alignment with the extruder and in a position to sense contact with the end of the pipe as it is completely inserted in the axially aligned holes or receivers. In another embodiment, the limit switch can be an optical sensor and transmitter pair connected to the controller.

Figure 8B:
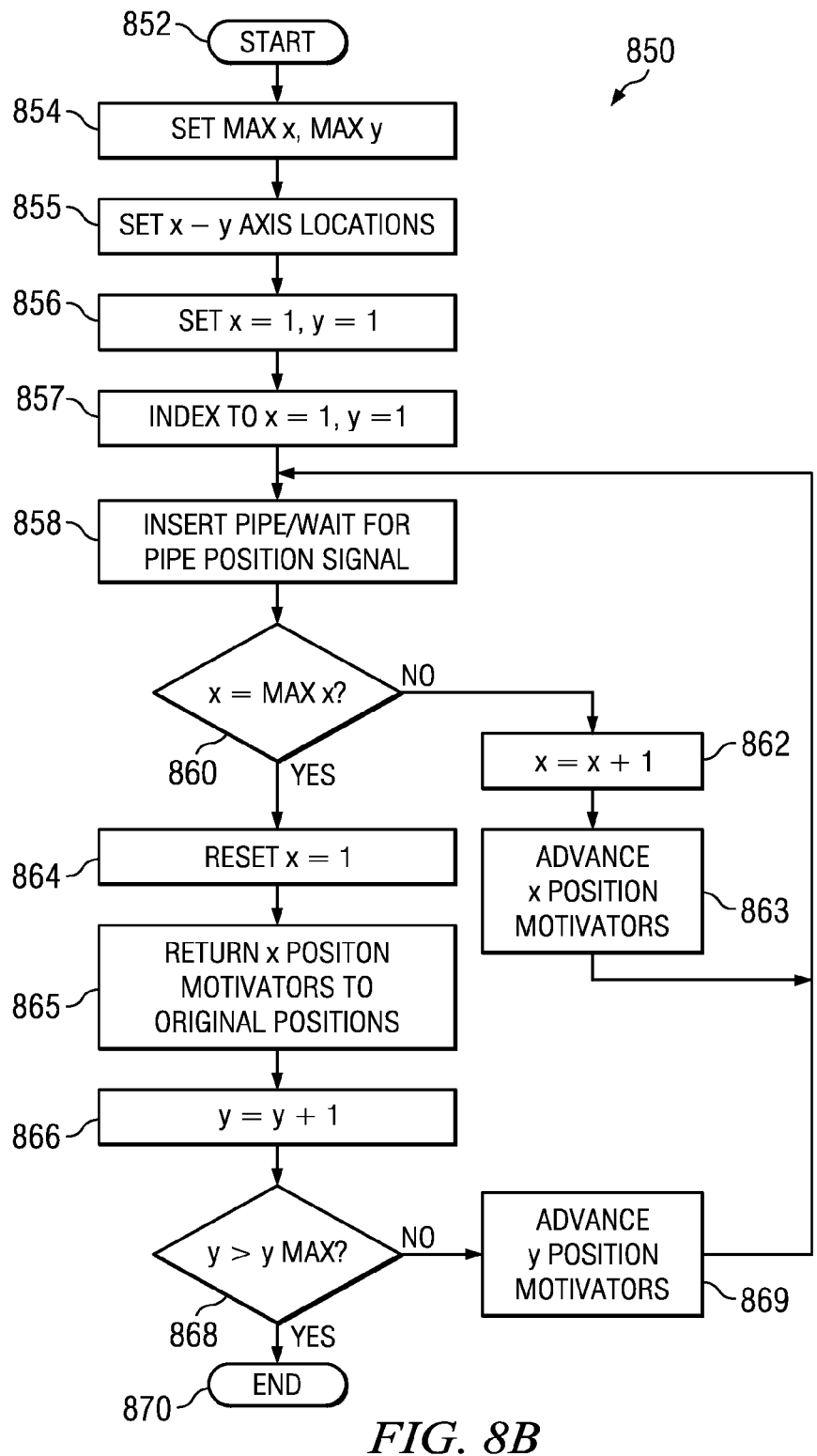
FIG. 8B is a flowchart of a method executed by the controller system.

Referring to FIG. 8B, the method 850 is described that is executed by the program resident on controller 1152.

At step 852, the program starts. At step 854, input is received from the operator regarding a maximum number columns in the template ("MAXX") and the maximum number of rows in the template ("MAXY"). At step 855, input is received which identifies each unique location in the x-y plane of an axis corresponding to the center of a particular receiver. The locators are numbered in a sequence of rows and columns each having an x-y address.

At step 856, the program then initiates and sets a variable x to 1, and initiates and sets a variable y to 1.

At step 857, the controller sends signals to the x position motivators 1154 and y position motivators 1156 sufficient to locate the frame and associated templates to the x=1, y=1 position corresponding to the first axis physical location.

At step 858, the controller waits for a signal from stop sensor 1158 indicating that a pipe has been inserted. At step 860, the controller compares the x location to the variable MAXX. If the variables are not equal, the program moves to step 862 and increments the x value by 1 and then proceeds to step 863. At step 863 the controller sends signals to the x and y motivators sufficient to physically move the frame to its x position. The new position coaxially locates the next receiver in order with the extruder and extrusion die. The program then returns to step 858. If the variables are equal, then the program proceeds to step 864 and resets the value of x to 1. At step 865, the controller send signals to the x motivators sufficient to return them to their original x position thereby aligning the original receiver with the extruder.

At step 866, the value of y is incremented by 1. At step 868, the program compares the value of y to MAXY. If the position of y is not greater than MAXY, then the program returns to step 869 where the controller send signals to the y position motivators sufficient to advance the frame to the next y position. The next y position corresponds to the row of empty receivers above the first row. The program then returns to step 858. If the value of y is greater than MAXY, then the program proceeds to step 870 and ends.

In a preferred embodiment the receivers are filled in order from left to right and bottom to top in order to increase duct bank stability. However, other orders of x-y positions can be used with success.

The program in a preferred embodiment is written in a basic interpretive language such as Basic or FORTRAN. However, other languages may be employed. In a preferred embodiment, the program is stored in physical memory at the controller. However, in other embodiments the program may be stored on a computer network connected to the controller on a removable permanent memory accessed by the controller.

Figure 7A:
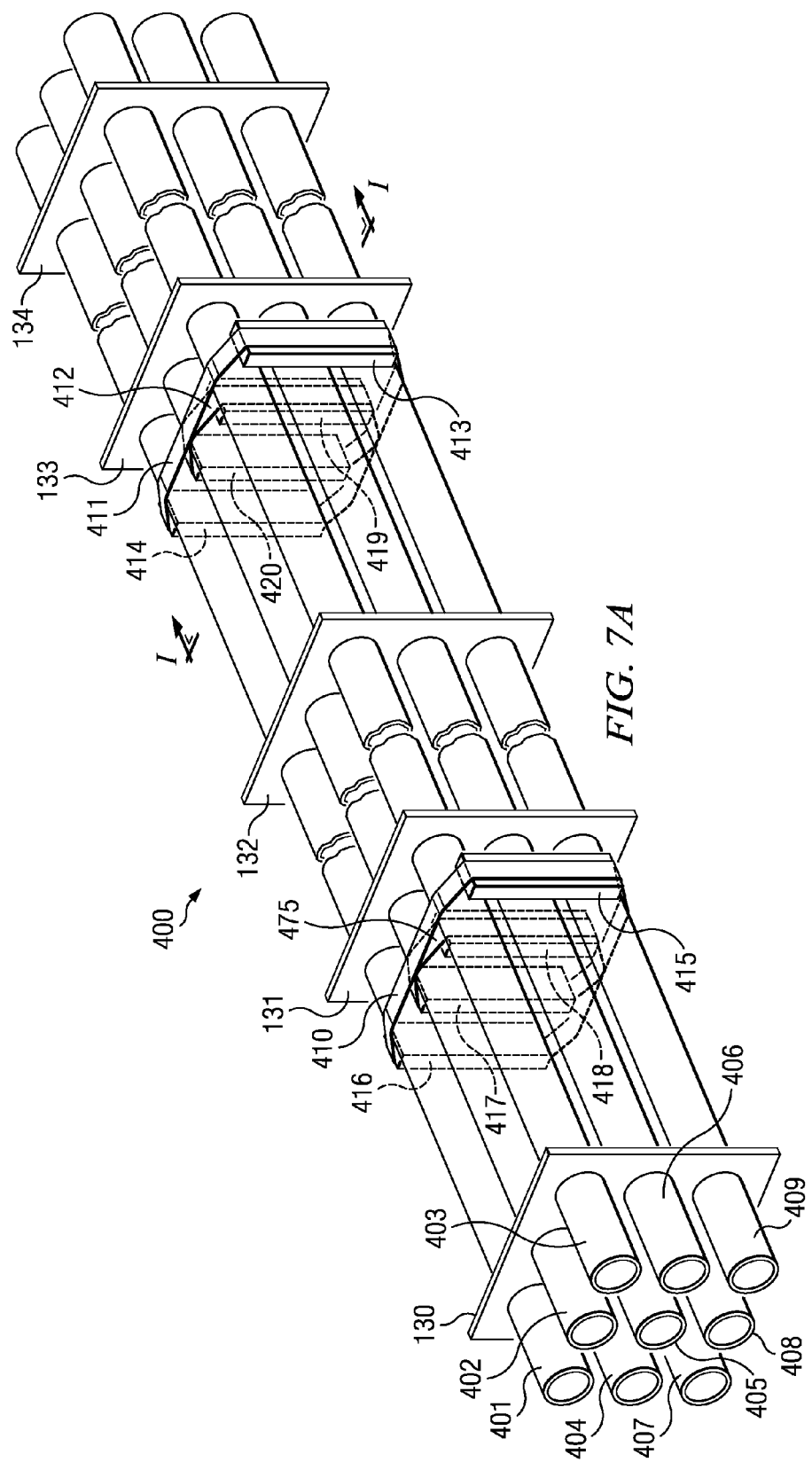
FIG. 7A is an isometric view of a duct bank of a preferred embodiment.

Referring to FIG. 7A, by way of example, after assembly, duct bank 400 comprises pipes 401, 402, 403, 404, 405, 406, 407, 408, and 409 inserted through templates 130, 131, 132, 133, and 134.

In a preferred embodiment, pipes 401, 402, 403, 404, 405, 406, 407, 408, and 409 are made of polyvinyl chloride (PVC). Other materials known in the art may be employed.

Band 475 surrounds pipes 402, 405, and 408. Blocks 417 and 418 position within duct bank 400 and held in position with band 475. Block 417 is held adjacent pipes 402, 405, and 408 by band 475. Block 418 is held adjacent pipes 402, 405, and 408, opposite block 417 by band 475. Band 410 surrounds pipes 401, 402, 403, 404, 406, 407, 408, and 409. Blocks 415 and 416 position on the outer sides of duct bank 400 and maintained in position by band 410. Block 415 is held adjacent pipes 403, 406, and 409 by band 410. Block 416 is held adjacent pipes 401, 404, and 407 by band 410.

Figure 7B:
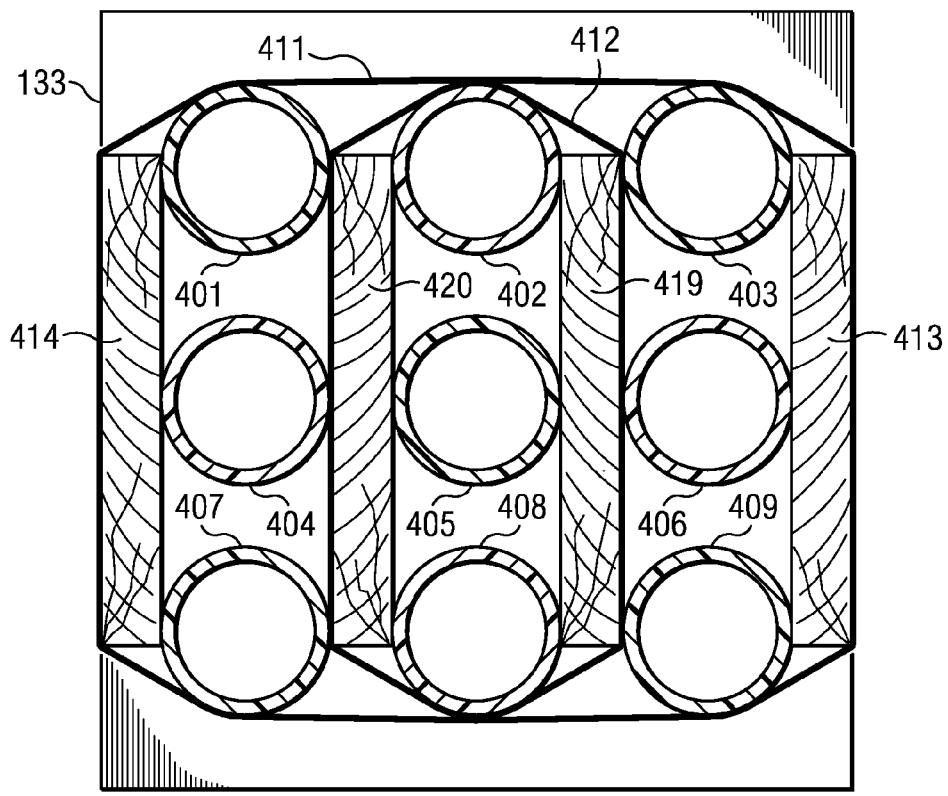
FIG. 7B is a partial section view taken along line I-I of FIG. 7A of a duct bank of a preferred embodiment.

Referring to FIGS. 7A and 7B, by way of example, band 412 surrounds pipes 402, 405, and 408. Blocks 419 and 420 position within duct bank 400 and held in position with band 412. Block 419 is held adjacent pipes 402, 405, and 408 by band 412. Block 420 is held adjacent pipes 402, 405, and 408, opposite block 419 by band 412. Band 411 surrounds pipes 401, 402, 403, 404, 406, 407, 408, and 409. Blocks 413 and 414 position on the outer sides of duct bank 400 and maintained in position by band 411. Block 413 is held adjacent pipes 403, 406, and 409. Block 414 is held adjacent pipes 401, 404, and 407 by band 411.

The position of bands 410, 411, 412 and 475 and the distance between each band is dependent upon the length, the strength, and the diameter of pipe to be used in duct bank 400, and the height and the width of duct bank 400. Further, the number of bands and blocks employed varies and is dependent upon the length, the strength, and the diameter of pipe to be used in duct bank 400, and the height and the width of duct bank 400.

In a preferred embodiment, bands 410, 411, 412 and 475 are made of polyester. Other materials known in the art may be employed.

In a preferred embodiment, blocks 413, 414, 415, 416, 417, 418, 419, and 420 are made of wood. Other durable materials known in the art may be employed.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. An apparatus for fabrication of a duct bank from an extrusion machine comprising:
   a moveable frame, adjacent the extrusion machine, having a set of support members;
   a set of templates, having a plurality of holes, supported by the support members;
   the plurality of holes forming a set of receivers;
   an extrusion die attached to the extrusion machine;
   a y directional carriage and an x directional carriage supporting the frame; and,
   a means for axially aligning each receiver of the set of receivers with the extrusion die utilizing the x directional carriage and the y directional carriage; and,
   whereby the extrusion machine extrudes a pipe for insertion into each receiver of the set of receivers to fabricate the duct bank.

2. The apparatus of claim 1, wherein the receivers form a rectangular geometric pattern.

3. The apparatus of claim 1 wherein the means for axially aligning further comprises:
   a controller;
   an x directional motivator, attached to the x directional carriage and operatively connected to the controller;
   a y directional motivator, attached to the y directional carriage and operatively connected to the controller;
   a limit switch, located at a pipe stop position adjacent the frame; and,
   the controller programmed to:
     activate the x directional motivator to position the set of receivers in a first x-y position;

acknowledge a signal from the limit switch indicating insertion of the pipe into a receiver of the set of receivers; and, activate the y directional motivator to position the set of receivers in a second x-y position.

4. The apparatus of claim 3 wherein the x directional motivator comprises at least one threaded drive.

5. The apparatus of claim 3 wherein the y directional motivator comprises at least one winch, connected to the frame by at least one cable.

6. The apparatus of claim 3 wherein the x directional motivator comprises at least one rack and pinion mechanism.

7. The apparatus of claim 3 wherein the y directional motivator comprises at least one hydraulic piston.

8. The apparatus of claim 1 wherein the movable frame further comprises a pair of channel members connected by the set of support members and supported by a set of castors.

9. The apparatus of claim 1 each of the support members is comprised of a slot formed by one of the group of angle braces, channel braces and triangle braces.

10. An apparatus for fabrication of a duct bank from duct pipe from an extrusion machine including an extrusion die and a cooling system and a cutting system comprising:

a frame, having a set of parallel slots, adjacent the cutting system;

a movable x positioning system supporting the frame;

a movable y positioning system supporting the frame;

a pipe insertion indicator;

a controller, operatively connected to the movable x position system, the movable y position systems and the pipe insertion indicator;

a set of planar rectangular templates, each template having a pattern of holes;

each template in the set of planar rectangular templates rigidly positioned in the set of parallel slots, whereby the pattern of holes forms a set of receivers, each receiver of the set of receivers having an axis;

the controller programmed to:

index each axis of each receiver of the set of receivers to a set of unique x-y positions;

activate the movable x positioning system and the y positioning system to coaxially locate a first axis of a first receiver of the set of receivers with a first unique x-y position;

receive a signal from the pipe insertion indicator indicating pipe insertion;

repeating the activate and receive steps for each unique x-y position of the set of unique positions;

whereby the duct bank is fabricated.

* * * * *